F. L. KITTREDGE.
BURNER.
APPLICATION FILED OCT. 12, 1911.
1,047,241.
Patented Dec. 17, 1912.
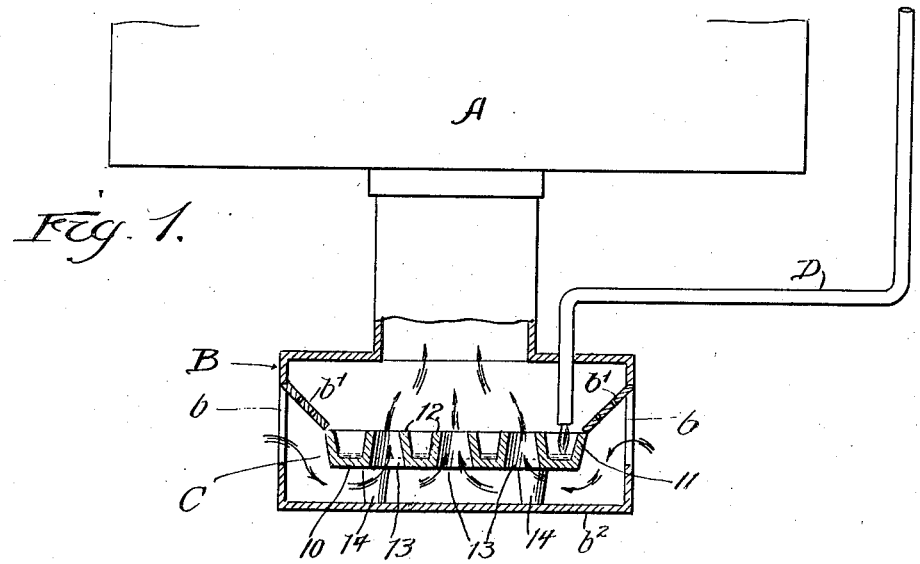
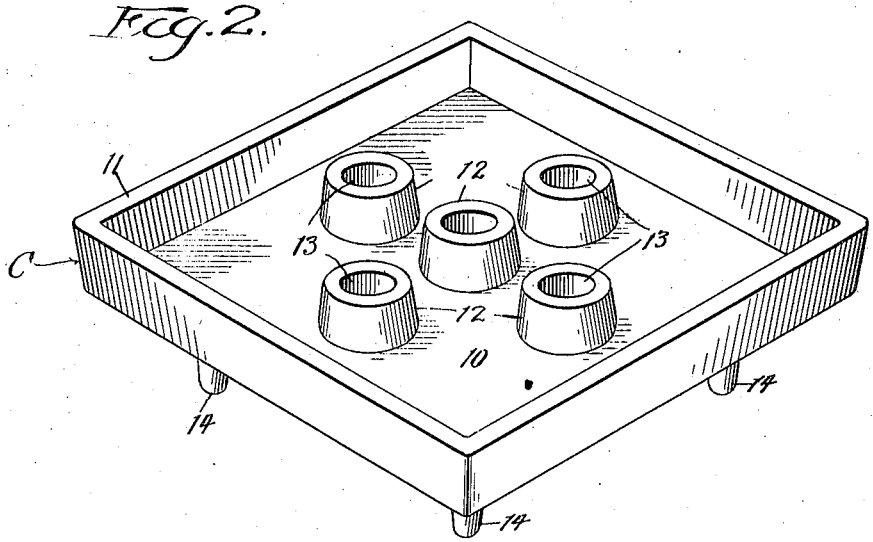
Witnesses:
Fannie F. Richards
G. C. Shervey
Inventor:
Frederic L. Kittredge,
by Charles O. Shervey
his Atty

UNITED STATES PATENT OFFICE.

FREDERIC L. KITTREDGE, OF CHICAGO, ILLINOIS, ASSIGNOR TO F. L. KITTREDGE & COMPANY, OF CHICAGO, ILLINOIS, A FIRM.

BURNER.

1,047,241. Specification of Letters Patent. Patented Dec. 17, 1912.

Application filed October 12, 1911. Serial No. 654,318.

*To all whom it may concern:*

Be it known that I, FREDERIC L. KITTREDGE, a citizen of the United States, residing at Chicago, in the county of Cook and State of Illinois, have invented new and useful Improvements in Burners, of which the following is a specification.

This invention relates to burners of that class designed for burning oil, such as kerosene, and the like, and the particular type of oil burners to which this invention has reference, is that in which oil is admitted into a pan over which the combustion takes place.

The object of this invention is to do away with certain objectionable features heretofore present in burners of this particular type, and to such ends this invention consists in the several novel features hereinafter set forth and claimed.

In the drawing furnished herewith Figure 1 is a vertical cross section through one form of my burner, showing the same applied to a simple form of china firing kiln and Fig. 2 is a perspective view of the burner.

Referring first to Fig. 1, A, represents a fragment of an ordinary china firing kiln and B, the combustion chamber, in which is placed the burner C; said combustion chamber has a number of air inlet openings $b$ through which air is admitted into said chamber and if desired, perforated deflector plates $b'$ are arranged between the tops of said air inlet openings and the top of the burner so as to direct the incoming air below the bottom of the burner. A supply pipe D, connected with a kerosene reservoir, or other suitable oil supply, leads down through the combustion chamber and discharges the oil upon the burner pan in the usual manner. The burner in its simplest form, comprises a pan having a flat bottom 10, (see Fig. 2) surrounded by a rim 11, projecting up from said bottom, and a number of bosses 12, projecting up from the bottom; said bosses are hollow and open out at top and bottom to form air passages 13 through the bottom 10. The bosses and rim act to confine the oil in the pan. The air passages in the bosses are of comparatively large area in cross section and approximately of the same height as their width. The tops of the bosses are low enough to permit the incoming air to mix with the burning gases at a point close to the surface of the oil. The best results are obtained in pan burners by continuously supplying a thin sheet of liquid fuel in the pan and delivering the air, coming through the air passages, close to the surface of the fuel. The body of the pan is shown as raised above the bottom $b^2$, of the combustion chamber to afford a clear passage for the air to the air passages 13, in the burner pan, and I have shown the pan as supported above the bottom by means of legs 14, projecting down from the bottom 10. The supply pipe D, is arranged to deliver the oil at one corner of the pan and the flow of oil should be so regulated that a thin sheet of oil will be constantly maintained in the pan during consumption.

In operation, the flow of oil is turned on and the oil ignited in the pan. Air being admitted directly to the body of the flame from below and therethrough, results in a more perfect combustion, giving an intenser heat and avoiding much of the disagreeable black smoke usually prevalent with the use of the common forms of oil burners.

While I have shown the burner as applied to a china firing kiln, it is obvious that the burner may be used in other situations and I do not therefore desire to be understood as limiting the invention to a burner for use in connection with china firing kilns.

The size and shape of the burner and exact number of air passages are immaterial to my invention, broadly considered, but the best results are obtained by providing sufficient air passages in the bottom plate in comparison to the area to supply the proper amount of air to the flame.

The burner has been succesfully used in china firing kilns, and produces a light colored flame of intense heat.

I claim as new and desire to secure by Letters Patent:

An oil burner of the class described, comprising a flat bottomed pan adapted to receive a liquid fuel and having an upstanding rim surrounding its marginal edges, its bottom being formed with a plurality of upwardly projecting bosses grouped together solely at and around the middle of the pan bottom, each boss having an unobstructed air passage therethrough of comparatively large area in cross section and of approximately the same height as its width, said air passages being arranged to admit the passage of a large volume of air therethrough at several places near the middle of the pan bottom, and close to the surface of the fuel.

In witness whereof, I have hereunto signed my name at Chicago, Cook county, Illinois, this 10th day of October, 1911.

FREDERIC L. KITTREDGE.

Witnesses:
CHARLES O. SHERVEY,
FANNIE F. RICHARDS.